US012718221B2

(12) United States Patent
Gao

(10) Patent No.: US 12,718,221 B2
(45) Date of Patent: Aug. 25, 2026

(54) DATA READING SYSTEMS WITH MULTIPLE IMAGE-PROCESSING MODES

(71) Applicant: Datalogic IP Tech S.r.l., Lippo di Calderara di Reno (IT)

(72) Inventor: WenLiang Gao, Eugene, OR (US)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 81 days.

(21) Appl. No.: 18/441,981

(22) Filed: Feb. 14, 2024

(65) Prior Publication Data

US 2025/0259157 A1 Aug. 14, 2025

(51) Int. Cl.

| | |
|---|---|
| ***G06K 7/10*** | (2006.01) |
| ***G06Q 20/20*** | (2012.01) |
| ***G06V 10/56*** | (2022.01) |
| ***H04N 9/73*** | (2023.01) |

(52) U.S. Cl.

CPC ........... *G06Q 20/208* (2013.01); *G06V 10/56* (2022.01); *H04N 9/73* (2013.01)

(58) Field of Classification Search

CPC .. G06Q 20/3276; G06Q 20/208; G06Q 20/20; G06Q 20/3274; G06Q 20/401; G06V 10/56; H04N 9/73

USPC ............................................. 235/454, 462.09

See application file for complete search history.

(56) References Cited

U.S. PATENT DOCUMENTS 6,505,775 B1 * 1/2003 Gu ........................... G01J 3/26 235/455
6,616,044 B1 * 9/2003 Gu ..................... G06K 7/10584 235/462.14
8,118,227 B2 * 2/2012 Veksland ........... G06K 7/10722 235/462.24
8,430,318 B2 4/2013 Mcqueen et al.
9,004,359 B2 4/2015 Shearin et al.
9,305,198 B2 4/2016 Thompson et al.
10,049,247 B2 8/2018 Gao
10,248,896 B2 4/2019 Gao et al.
10,970,502 B2 4/2021 Canini et al.
12,217,128 B2 * 2/2025 Barkan ................ G06V 10/761
12,380,892 B2 * 8/2025 Gupta ..................... G10L 17/22
2016/0063499 A1 * 3/2016 Sugiyama ............ G06Q 20/407 705/23
2016/0132855 A1 5/2016 Yamamoto
2020/0065644 A1 * 2/2020 Staton .................. G06Q 20/382
2020/0117866 A1 4/2020 Miyakoshi et al.
2023/0025837 A1 1/2023 Kim (Continued)

OTHER PUBLICATIONS

European Patent Office, Extended European Search Report for European Patent Application No. 25157565.0, mailed May 28, 2025, 9 pages.

*Primary Examiner* — Daniel St Cyr

(74) *Attorney, Agent, or Firm* — Stoel Rives LLP

(57) ABSTRACT

The disclosure relates to a data reading system and related methods of operation designed for optimizing and efficiently handling various image-processing functionalities of a data reading system. The data reading system includes a data reader configurable in at least a first image-processing mode for reading and decoding optical codes from acquired image data and in a second image-processing mode for performing image analysis to identify the item. The image-processing modes may be selectively or automatically toggled as needed for completing a transaction.

19 Claims, 8 Drawing Sheets

(56) References Cited

U.S. PATENT DOCUMENTS

| | | | | |
|---|---|---|---|---|
| 2023/0169287 | A1* | 6/2023 | Gao | G06K 7/10722<br>235/462.01 |
| 2023/0196044 | A1 | 6/2023 | Hoetter et al. | |
| 2023/0206205 | A1 | 6/2023 | Howard et al. | |
| 2024/0292083 | A1* | 8/2024 | Barish | G06V 10/60 |

* cited by examiner

CUSTOMER
DIRECTION OF MOTION
TRAILING SIDE
TOP
CUSTOMER SIDE
BOTTOM
BONNET SIDE
LEADING SIDE

| ISP Module Features | Color Camera Module (CCM) | Barcode-Mode | Balanced-Mode | FullColor-Mode | Notes |
|---|---|---|---|---|---|
| HDR Stitch | X | X | X | X | High Dynamic Range Mode (Through Hardware) |
| TPG | X | X | X | X | Test Patterns Generation |
| Expand LUT | X | X | X | X | Expand Look-Up-Table |
| BLC | ✓ | X | ✓ | ✓ | Black Level Correction |
| De-Gamma | X | X | X | X | De-Gamma (Image Data Linearization) |
| LSC | ✓ | X | ✓ | ✓ | Lens Shading Correction (Achromatic Aberration & Vignetting) |
| AWB Gain | ✓ | ✓ | ✓ | ✓ | Automatic White Balance |
| DPCC | ✓ | X | ✓ | ✓ | Defect Pixel Cluster Correction |
| DPF | ✓ | X | ✓ | ✓ | De-noising Pre-Filter |
| WDR | X | X | X | X | Wide Dynamic Range (Image Data Processing) |
| AE/G | ✓ | X | X | ✓ | Automatic Expsoure / Gain Control (Exposure Priority) |
| Exposure | 0~11ms | 0~200μs | 0~200μs | 0~11ms | Manual Exposure |
| Gain | Auto | Fixed | Fixed | Auto | Analog / Digital Gain |
| Target | 60% | 60% | 60% | 60% | Target Gray Scale for AE/G Algorithm |
| De-Mosaic | ✓ | ✓ | ✓ | ✓ | Interpolate Pixel Value from CFA to Full Color |
| CNR | ✓ | X | ✓ | ✓ | Color Noise Reduction |
| CCM | ✓ | X | ✓ | ✓ | Color Correction Matrix |
| GWDR | ✓ | X | ✓ | ✓ | Global Wide Dynamic Range (Tune Curve) |
| Gamma Out | X | X | X | X | R,G,B Separate Gamma |
| CSC | ✓ | ✓ | ✓ | ✓ | Color Conversion (RGB to YUV444) |
| 4:2:2 Conv | ✓ | ✓ | ✓ | ✓ | Barcode Reading Mode, YUV420 is Preferred. |
| Image Stabilizer | X | X | X | X | Image Stablizing for Video Capture |
| CPROC | ✓ | X | ✓ | ✓ | Color Processing |
| MP DMA Write | ✓ | ✓ | ✓ | ✓ | Dynamic Memory Access (write the output image data to memory on-the-fly) |
| De-Warp | X | X | X | X | Distortion Correction |

400

IMAGE CAPTURED IN TDR MODE 1
(LUMINANCE Y CHANNEL USED FOR BARCODE READING TO VL DECODING LIBRARY)
500
FIG. 5
IMAGE CAPTURED IN TDR MODE 2 (LUMINANCE Y CHANNEL ONLY)
600
FIG. 6

IMAGE CAPTURED IN TDR MODE 1 (IN BARCODE READING MODE)
700
FIG. 7
IMAGE CAPTURED IN TDR MODE 2 (FOR PRODUCE RECOGNITION)
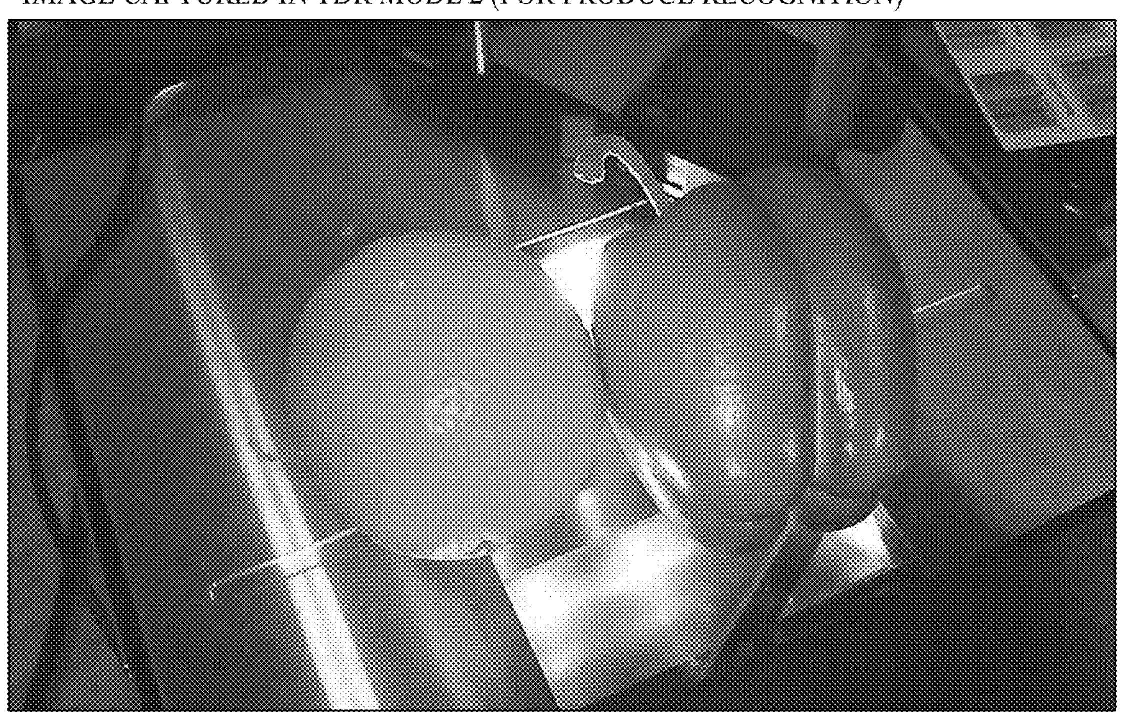
800
FIG. 8

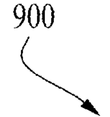

| Implementation Example (1: enable, 0: disable) | | | |
|---|---|---|---|
| Parameters | Mode 1 (Default) (Barcode-Mode) | Mode 2 (FullColor-Mode) | Mode 3 (Balanced-Mode) |
| AE | ae,0 | ae,1 | ae,0 |
| AWB | awb,0 | awb,1 | awb,1 |
| BLS | bls,0,0,0,0 | bls,60,60,60,60 | bls,60,60,60,60 |
| CAC | cac,0 | cac,1 | cac,1 |
| CNR | cnr,0 | cnr,1 | cnr,1 |
| CPROC | cproc,0 | cproc,1 | cproc,1 |
| DPCC | dpcc,0 | dpcc,1 | dpcc,1 |
| DPF | dpf,0 | dpf,1 | dpf,1 |
| Filter | filter,0 | filter,1 | filter,1 |
| GC | gc,0 | gc,1 | gc,1 |
| WDR | wdr,0 | wdr,1 | wdr,1 |
| HDR | hdr,0 | hdr,1 | hdr,1 |
| cc.matrix | wb.cc.matrix, 1,0,0,0,1,0,0,0,1 | wb.cc.matrix,1.734,-0.133,-0.662,-0.468,1.953,-0.290,-0.578,-0.375,3.188 | wb.cc.matrix,1.734,-0.133,-0.662,-0.468,1.953,-0.290,-0.578,-0.375,3.188 |
| cc.offset | wb.cc.offset,0,0,0 | wb.cc.offset,-650,-192,-100 | wb.cc.offset,-650,-192,-100 |
| wb.gains | wb.gains, 0.9510,1,1,1.0655 | wb.gains,2.215,1.16,1.16,1 | wb.gains,2.215,1.16,1.16,1 |

DATA READING SYSTEMS WITH MULTIPLE IMAGE-PROCESSING MODES

BACKGROUND

The present disclosure relates generally to data reading systems in a retail setting, and more particularly, to such systems and related methods for optimizing and efficiently handling various image-processing functionalities of a data reading system.

Data reading systems in general are used in a variety of settings for reading optical codes, capturing images of items, and acquiring other suitable data for processing items. In a retail environment, data reading devices are well known for reading (typically via monochrome image sensors) UPC and other types of optical codes, such as barcodes, digital watermarks, etc., on grocery items or packages to identify and add the item to a customer's transaction list for purchasing during a checkout process. Some data reading systems are equipped with more advanced imaging technologies that can be used for item and produce recognition, item verification, and other security applications during the checkout process. In self-checkout systems, these advanced features may be particularly advantageous to ensure proper item processing and avoid or minimize losses from retail theft or inadvertent processing errors by customers.

Some conventional data reading systems include multiple data readers or imagers for accomplishing various data reading tasks. For example, one data reading system may include one or more monochrome (or color) imagers optimized for acquiring and decoding optical codes, and also include one or more color imagers optimized for acquiring item images for more advanced imaged analysis, such as for item recognition and security applications as described above. In some configurations, a monochrome imager may be best-suited for processing monochrome data (including many optical codes found on items) and a color imager is best-suited for obtained sufficiently detailed images for handling item recognition and related applications. Typically, monochrome imagers and color imagers operate under different conditions to ensure they are each optimized for their respective task. For example, a monochrome imager for optical code reading typically uses active illumination sources (e.g., LEDs) at very short exposure times and illumination pulse (e.g., 100 μs-200 μs) to minimize motion blur. On the other hand, a color imager for item recognition and related applications typically uses ambient light for more even light distribution on the target and tolerates motion blur, so it requires automatic exposure control (AEC) and longer maximum exposure times (e.g., 10 ms-50 ms) for more ambient light.

While conventional data reading systems with multiple imagers as described above may be deployed successfully for data reading applications, the multiple-imager configuration increases the complexity and cost of the underlying data reading system. Accordingly, the inventor has identified a need for an improved data reading system designed for efficiently accomplishing both optical code reading tasks and image-recognition related tasks using a single color imager configured with different image-processing modes for accomplishing these data reading applications. Additional aspects and advantages of such systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 4 is an example table summarizing ISP features for enabling three image-processing modes of a data reader in accordance with one embodiment.

FIG. 5 is an example image illustrating optical codes captured using a first image-processing mode in accordance with one embodiment.

FIG. 6 is an example image illustrating optical codes captured using a second image-processing mode in accordance with one embodiment.

FIG. 7 is an example image illustrating produce captured using the first image-processing mode in accordance with one embodiment.

FIG. 8 is an example image illustrating produce captured using the second image-processing mode in accordance with one embodiment.

FIG. 9 is a table illustrating different parameter configurations that are enabled and disabled for each of the image-processing modes of the data reading system in accordance with one embodiment.

DETAILED DESCRIPTION OF DISCLOSED EMBODIMENTS

Figure 1:
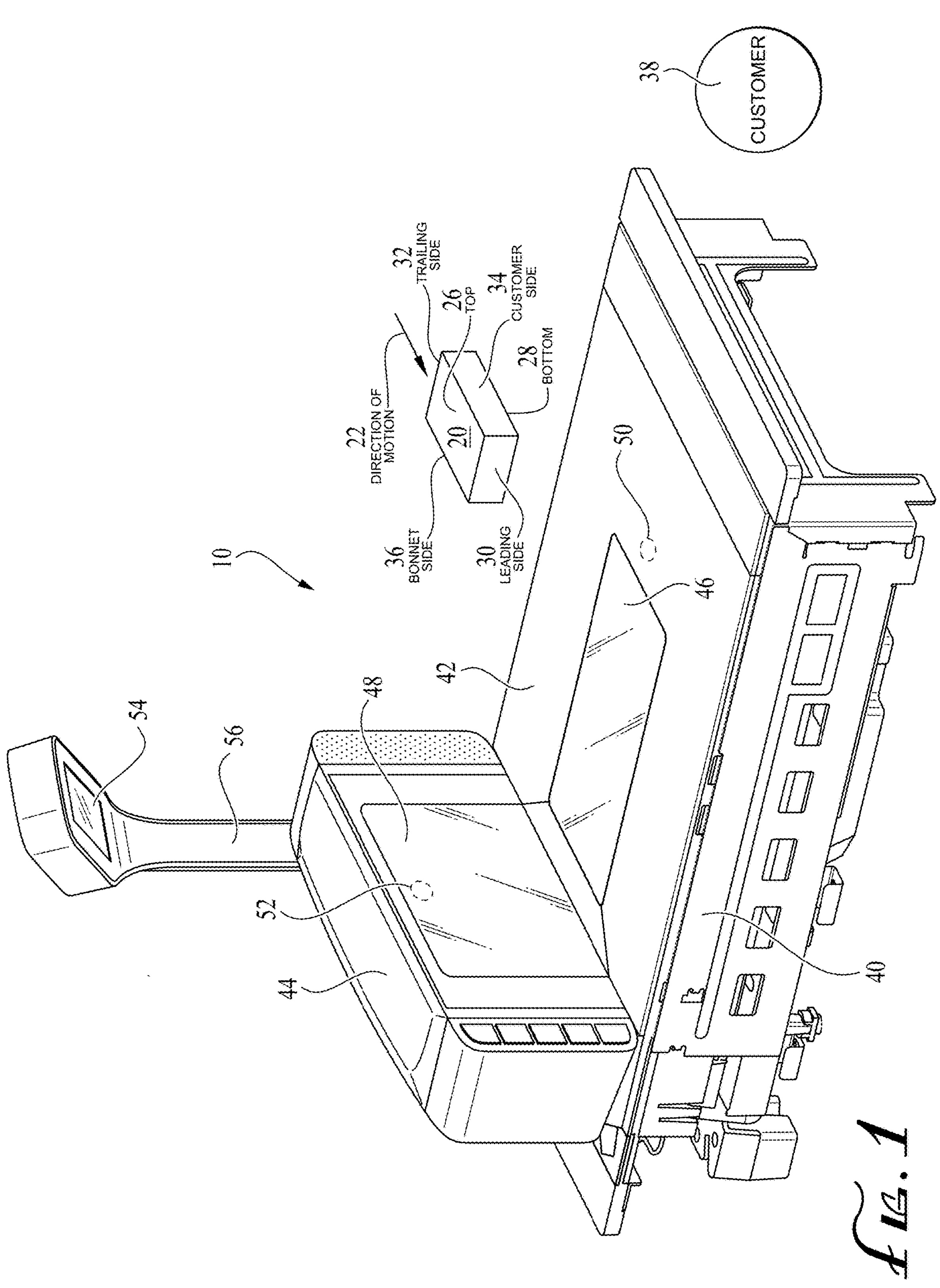
FIG. 1 illustrates a data reading system operable for scanning items and processing a purchase transaction in accordance with one embodiment.

With reference to the drawings, this section describes specific embodiments relating to a data reading system and its detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With collective reference to the figures, the following disclosure generally relates to a data reading system, such as a self-checkout system or other suitable point-of-sale system, that may be used in a retail setting to complete a customer transaction for the purchase of various goods offered in a retail facility. The data reading system may include any suitable data readers operable for capturing data from an item and any suitable reading engine configuration for decoding the captured data to complete the retail transaction.

As mentioned previously and further described in detail below, conventional data reading systems typically include multiple imaging devices, each having different optical characteristics and configurations optimized to achieve a specific function. For example, data reading systems may include one or more data readers optimized for optical code and barcode reading from items passing through the read region of the data reading system, and may also include one or more color data readers optimized for item recognition, item verification, and other suitable processes that may require high quality, color images for more intensive image-analysis.

The embodiments described herein with reference to the figures relate to an improved data reading system with efficient and optimized image processing capabilities. As further described below, the data reading system implements a color data reader that may be configured with an optical code reading functionality in a first image-processing mode and an image acquisition and processing functionality in a second image-processing mode. In other words, the data reading system uses the same data reader which may be configured to selectively or automatically toggle between at least two image-processing modes as needed for different applications. In other embodiments, the data reading system may include any suitable number of image-processing modes for configuring the color data reader as desired to achieve other suitable functionalities. Accordingly, one advantage of the disclosed data reading system is that it streamlines the overall design by minimizing the number of data readers needed to achieve desired data reading functionalities, which in turn minimizes complexity and cost of the data reading system. Additional details of these and other embodiments of the data reading system and related methods are further discussed below with reference to the accompanying figures.

FIG. 1 illustrates an example embodiment of a data reading system 10 in accordance with one embodiment. The following section briefly describes general components of the data reading system 10 and provides an example operation of the data reading system 10 when used in a retail establishment to process a transaction. With reference to FIG. 1, the data reading system 10 is used to scan, weigh (as needed), and pay for items 20 as part of a customer transaction. In some embodiments, the data reading system 10 may be designed as a self-checkout system for processing transactions without the need for assistance by store clerk or other personnel. In other embodiments, the data reading system 10 may instead be incorporated into a checkout counter operated by a clerk. For discussion purposes, it should be understood that while the drawings and relevant discussion may reference the data reading system 10 as a self-checkout system, embodiments of the disclosure also include systems that may be operated by a store clerk in an assisted checkout lane environment. Thus, it should be understood that references to "customer" are also applicable to a "clerk" or "operator" who may be the user of the data reading system 10 in certain situations. In addition, the scope of the disclosure incorporates other configurations for data reading systems that incorporate a scale.

As illustrated in FIG. 1, the data reading system 10 is operable to obtain information (e.g., optical codes, images, etc.) from an example six-sided item 20 (e.g., a grocery item) that is passed along a direction of motion 22 through a read region of the data reading system 10. For general purposes of discussion, the item 20 is represented in the figures as a six-sided, box-shaped package having a top surface 26, a bottom surface 28, a leading side 30, a trailing side 32, a customer side 34, and a bonnet side 36. While the item 20 is illustrated and described as a box-shaped package for convenience, it should be understood that the item 20 may encompass other shapes, including, for example, round fruits or vegetables, cylindrical cans, irregularly shaped packages, such as a bag of potatoes, potato chips, or the like.

The data reading system 10 may be a two-plane or bioptic reader having a housing that includes a lower base section 40 supporting a platter 42, and a bonnet or raised upper section 44 extending from and protruding upwardly from the platter 42 (and the lower base section 40). The data reading system 10 further includes a scale 164 (see FIG. 2) disposed underneath the platter 42 and within the lower base section 40, where the scale 164 includes load cells or receptors operable to weigh the item 20 (such as for items sold by weight) when the item 20 rests against the top surface of the platter 42. In some embodiments, the scale 164 may be incorporated into or otherwise operable in conjunction with the platter 42.

The data reading system 10 includes one or more data readers 50 housed within lower base section 40 underneath the platter 42, and the bonnet 44 may further include one or more data readers 52 housed therein. The data readers 50, 52 are arranged within the platter 42 and bonnet 44, respectively, to project their fields-of-view through the respective windows 46, 48 to capture image or other suitable data for decoding an optical code on the item 20 as it moves through the combined read region of the data readers 50, 52 of the data reading system 10. In some embodiments, the data reading system 10 may incorporate mirrors or any other suitable optical components (not shown in FIG. 1) within the lower base section 40 and bonnet 44 to ensure the respective fields-of-view of the data readers 50, 52 are directed as needed to capture data from the item 20. In other embodiments, the data reading system may be a single plane reader without a bonnet or may have other suitable configurations, including having a top-down data reader (see 152 of FIG. 2) that includes a stand extending upwardly from the lower base section 40 and above the bonnet 44. The top-down data reader includes a head with one or more data readers therein arranged to project a field-of-view from an elevated position downwardly onto the platter 42.

The data reading system 10 further includes a top-down data reader (TDR) 54 that includes a post section 56 extending upwardly from the housing 40 to any suitable height such that the TDR 54 extends above the bonnet 44 and provides an overhead view of the read region and the platter 42 to complement the view of the internal data readers 50, 52. Like the data readers 50, 52, TDR 54 is operable to capture image data for an item 20 as it moves through the read region and the platter 42 of the data reading system 10.

For purposes of this disclosure, reference to a "data reader" is used in an expansive sense to describe any suitable device (or combination of devices) capable of obtaining image data and/or other suitable data from an item 20 in a field-of-view of the device. The captured data may thereafter be used for decoding coded information from an item 20 and/or for accomplishing any other suitable purpose related to the data reading system 10. In some embodiments, a data reader may include a camera or other suitable imaging system, a processor, a decoding unit, and a controller for communicating data to other data readers or external systems for processing. In other embodiments, the data reader may include a subset of these components within a common housing and other components may be external to the data reader itself. For example, in one embodiment, the data readers may each include an imager designed to obtain images of the item 20 and to communicate those images to the decoding unit (which may be part of the processor) in an external database for decoding the coded information captured in the images and identify the item 20. Likewise, reference to a "color data reader" may include a similar imager-based or other suitable system as described above operable to capture and/or process color image data from objects within its field-of-view.

"Image data" as used herein may include raw images as well as processed images (e.g., cropped, compressed, etc.) from the raw images as well as other forms of data derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers arranged at various positions within the housing of the data reading system, such as in a horizontal base unit or a vertical bonnet of a bi-optic data reader having imagers positioned in two different planes. Single plane scanners (e.g., horizontal or vertical only housings) are also contemplated and are within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems. In some cases, image data and images may be used interchangeably herein.

The data readers 50, 52, 54 may include any suitable decoding algorithms to decode coded information from the item 20 that may be contained within one-dimensional codes, two-dimensional codes, stacked codes, or other code configurations. In this disclosure, the data readers 50, 52, 54 may be referenced as including imagers or imaging systems, but it should be understood that the reference is meant to provide an example configuration for the data readers. Other data reading systems and data reader configurations may be used without departing from the principles of the disclosed subject matter. Examples of various configurations include those described in any of the following: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Pat. No. 10,970,502, issued Apr. 6, 2021, and entitled "DATA COLLECTION SYSTEMS AND METHODS TO CAPTURE IMAGES OF AND DECODE INFORMATION FROM MACHINE-READABLE SYMBOLS," and U.S. Patent Application Publication No. 2023/0206205, filed Nov. 29, 2022, and entitled "FIXED RETAIL SCANNER WITH MULTI-PORT NETWORK SWITCH AND RELATED METHODS, the disclosure of each of which is incorporated by reference herein in its entirety.

With reference to FIG. 1, the following provides an example operation of the data reading system 10 in accordance with one embodiment. During a transaction, the item 20 is moved along the direction of motion 22 across the platter 42 above the horizontal scan window 46 and in front of the vertical scan window 48. As the item 20 is moved across the scan windows 46, 48, the data readers 50, 52, 54 cooperate to obtain image data for all sides of the item 20 to find and decode the optical code. For example, if the optical code (or other target data) is present on the bonnet side surface 36 of the item 20, the data reader 52 reading through the vertical window 48 of the bonnet 44 will capture the optical code in an image of the side surface 36 for decoding. Similarly, if the optical code is on the bottom surface 28 of the item 20, then the data reader 50 reading through the horizontal window 46 may capture the optical code in an image for decoding. Likewise, TDR 54 may also capture images and/or process optical codes along a top surface 26 of the item 20. If the optical code is on any of the remaining surfaces of the item 20, one or all data readers 50, 52, 54 (either individually or in combination) may capture image views bearing the optical code on the item 20 for decoding. For items 20 sold by weight, the item 20 is positioned on the platter 42 for weighing via the scale 164.

If the optical code is positively captured and decoded or if the item weight is accurately obtained, the data reading system 10 may emit a beeping (or other) sound indicating that the item 20 has been processed, and the customer 38 may proceed to the next item 20. Alternatively, the data reading system 10 may emit a different beeping (or other) sound indicating that the item 20 was not properly processed and present a message requesting that the customer 38 reprocess the item 20. Other feedback methods may also be provided, such as visual feedback (e.g., via an LED or an electronic display), indicating a successful read or an unsuccessful read.

In some embodiments, the data reading system 10 may include a display 158 (see FIG. 2) operable to display information, such as a running transaction list of the items 20 purchased, images, selectable icons, text, or other suitable information to facilitate the transaction. In some embodiments, the display 158 may show an image of a purchased item captured by the data readers 50, 52, 54 (or other cameras internal to the data reader housing), a list of purchase items and running costs, the weight of an item and the cost per pound of the item, or other suitable transaction information associated with the items 20. In some embodiments, the display 158 may be a touch screen that allows the customer 38 to interact directly with the screen (or via a stylus or other suitable instrument) to enter information and respond to prompts to allow the customer 38 to manage the transaction. The touch screen may be any of several suitable display types, such as an integrated liquid crystal (LCD) display, an organic light-emitting diode (OLED) display, or other display with suitable touch screen capabilities for detecting the customer's touch via a finger, stylus, or other suitable input device.

Figure 2:
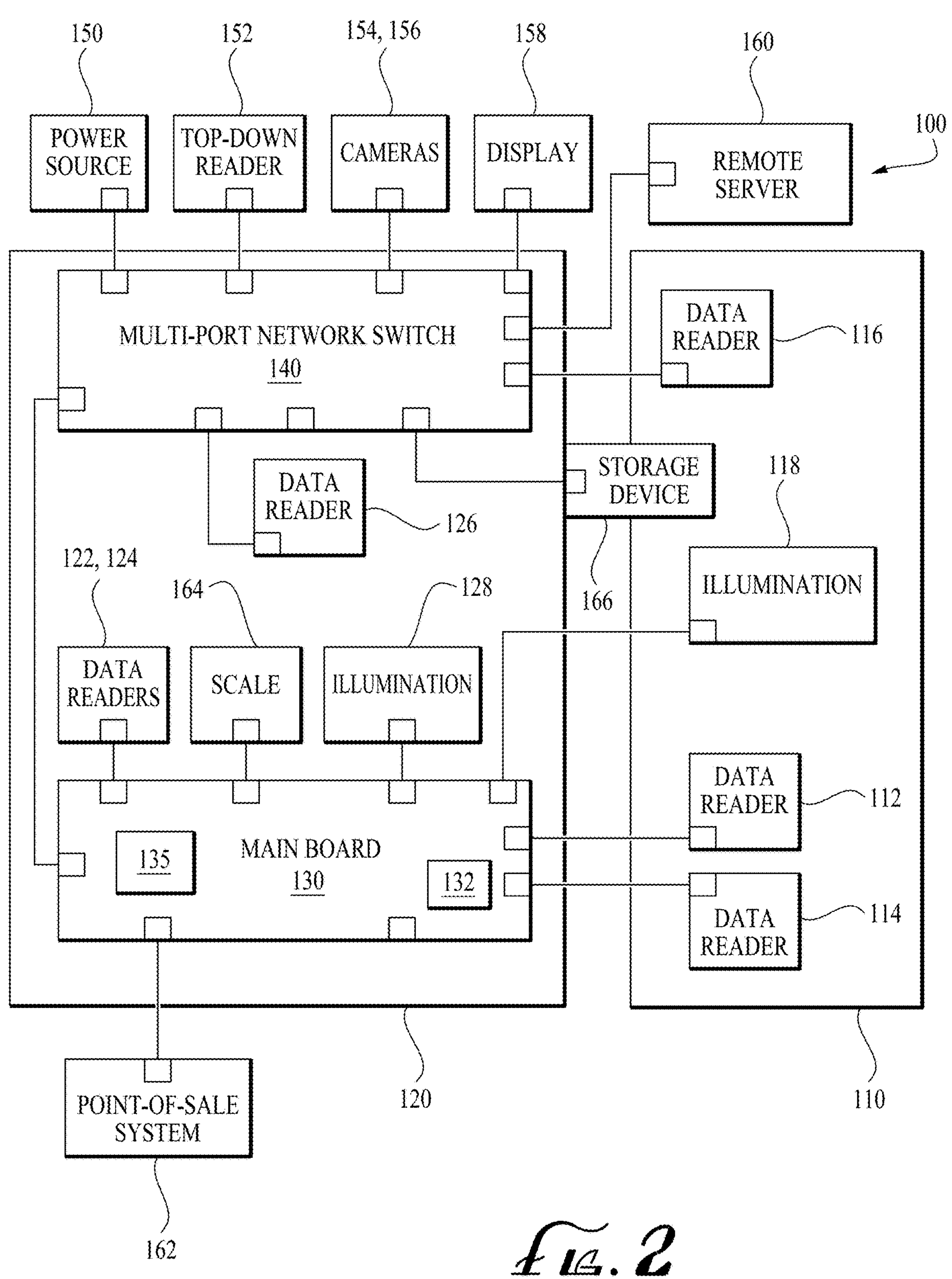
FIG. 2 is a simplified block diagram illustrating components of a data reading system in accordance with one embodiment.

FIG. 2 is a simplified block diagram of a data reading system 100 according to an embodiment of the disclosure. As illustrated in FIG. 2, the data reading system 100 may be operably coupled with one or more of a power source 150, a top-down reader (also referred to as a "TDR") 152, peripheral cameras 154, 156, a display 158, a remote server 160, and/or a point of sale (POS) system 162. Additional details of the data reading system 100 are described below.

With reference to FIG. 2, the data reading system 100 may be a bi-optic data reader having a vertical housing 110 and a horizontal housing 120 (arranged in a similar fashion as the data reader 10 of FIG. 1) in some embodiments. The data reading system 100 may be installed in a retail environment (e.g., grocery store), which typically is disposed within a counter or other support structure of an assisted checkout lane or a self-checkout lane. The vertical housing 110 provides an enclosure for one or more data readers 112, 114, 116, active illumination assemblies 118 (e.g., LED assemblies), and other optical elements (e.g., lenses, mirrors, etc.) and electrical elements (e.g., cables, circuit boards, etc.) therein. Similarly, the horizontal housing 120 provides an enclosure for one or more data readers 122, 124, 126, active illumination elements 128 (e.g., LED assemblies), a scale 164, and other optical elements (e.g., lenses, mirrors, etc.) and electrical elements (e.g., cables, circuit boards, etc.) therein. Bi-optic data readers tend to have a larger horizontal housing 120 as compared to the vertical housing 110, which provides space to support various components of the data reading system 100 and the scale 164 used to weigh produce or other items sold by weight or otherwise perform weighing of items when placed on the horizontal surface (often called a "weigh platter").

In some embodiments, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field of view may be physically located within the vertical structure and vice versa.

In one embodiment, the data reading system 100 may include one or more different types of data readers, such as monochrome imagers and/or color imagers. For example, in one embodiment, data readers 112, 114 in vertical housing 110 may be monochrome imagers configured to capture monochrome images through the vertical window (e.g., window 48 of FIG. 1) of the data reading system 100. Likewise, data readers 122, 124 in horizontal housing 120 may be monochrome imagers configured to capture monochrome images through the horizontal window of the data reading system 100. Data reader 116 in vertical housing 110 may be a color camera module configured to capture color images through the vertical window of the data reading system 100. Likewise, data reader 126 in horizontal housing 120 may be a color camera module configured to capture color images through the horizontal window of the data reading system 100. Similarly, peripheral cameras 154, 156 may be either monochrome imagers and/or color imagers. In such embodiments, monochrome images may be analyzed (e.g., by a decoder) to decode one or more indicia (e.g., 1D barcodes, 2D barcodes, optical character recognition, digital watermarks, etc.), and color images may be analyzed (e.g., by an image processor) where color information may be particularly advantageous, such as produce recognition, item recognition or verification, and security analysis. Such analysis may be performed by local and/or remote processors that may contain an artificial intelligence (AI) engine or otherwise configured to perform other machine learning techniques.

The data reading system 100 may further include a main board 130 and a multi-port network switch 140. As shown herein, the main board 130 and the multi-port network switch 140 may be disposed within the horizontal housing 120 in one embodiment. It is contemplated that other embodiments may instead include the main board 130 and/or the multi-port network switch 140 within the vertical housing 110. In an embodiment where one of the multi-port network switch 140 or the main board 130 is disposed within the vertical housing 110 and the other is disposed within the horizontal housing 120, the two boards may be generally oriented orthogonal to each other similar to the orientation of the windows or another angled relationship (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the data readers 112, 114 and the data readers 122, 124, such as via a communication interface (e.g., a MIPI interface) or other suitable interface. The main board 130 may have decoding software embedded therein and/or stored within internal memory 132 such that one or more on-board processors 135 may receive monochrome images to perform decoding on the optical indicia and provide the decoding result to a point of sale (POS) system 162 operably coupled thereto to complete a transaction. The one or more on-board processors 135 may also be configured to provide control (e.g., coordination or synchronization) of the various components of the system including camera exposure and timing of active illumination assemblies 118, 128 of the system. In addition, the one or more on-board processors 135 may also manage a boot sequence for initializing the data reading system 100 and for powering and configuring the various components of the data reading system 100 as further discussed with particular reference to FIG. 3. Suitable software and/or executable instructions for managing the boot sequence and other aspects of the data reading system 100 may be stored within internal memory 132 or another suitable location in communication with the processors 135.

Although a single block is shown representing one or more on-board processors 135, it is contemplated that some embodiments may include multiple processing components (e.g., microprocessors, microcontrollers, FPGAs, AI accelerator modules, etc.) configured with suitable instructions and programming to perform different tasks, alone or in combination, including object detection, system control, diagnostic and performance monitoring, optical code decoding, optical character recognition, artificial intelligence, machine learning analysis, and/or image processing techniques to support the functionality of the data reading system 100.

In one embodiment, the multi-port network switch 140 may be operably coupled to data reader 116, data reader 126, and with main board 130 located within the data reading system 100. Multi-port network switch 140 may also be operably coupled to the power source 150 as well as peripheral devices such as TDR 152, peripheral cameras 154, 156, display 158, the remote server 160, and/or a removable storage device 166. The number and types of peripheral devices may depend on a desired application within a retail environment. The TDR 152 may be configured as a stand connected to the data reading system 100 that typically provides a generally close overhead (angled) view of the read-zone to provide a top view of a product (as illustrated in FIG. 1) whereas internal data readers 112, 114, 116, 122, 124, 126 may be better suited for capturing images of the bottom and/or sides of the object within the read-zone. Additional TDRs are also contemplated as being connected to the data reading system 100. In some embodiments, peripheral cameras 154, 156 may be located remotely from the housing of the data reading system 100 such as being mounted on a ceiling or wall of the retail environment to provide additional views of the read-zone or checkout area. Such views may be useful for security analysis of the checkout area such as product verification, object flow, and human movements with the retail establishment. Such analysis may be performed by a remote service or other local devices (e.g., located on or otherwise coupled to the main board 130 or ethernet switch 140). Other peripheral devices may be located near the data reading system 100, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 162 may be coupled directly to the main board 130. Such a connection may be via communication interfaces such as USB, RS-232, or other such interfaces. In some embodiments, the POS 162 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135. The multi-port network switch 140 may include a plurality of ports to provide advanced network connectivity (e.g., Ethernet) between internal devices (e.g., CCMs 116, 126) within the data reading system 100 and external devices (e.g., TDR 152, peripheral camera(s) 154, 156, display 158, remote server 160, etc.) disposed outside the vertical and horizontal housings 110, 120 of the data reading system 100. Thus, the multi-port network switch 140 may provide an Ethernet backbone for the elements within the data reading system 100 as well as for external devices coupled to the data reading system 100 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products or devices configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reading system 100.

Although FIG. 2 shows one block for active illumination assemblies 118, 128 in each of the vertical and horizontal housings 110, 120, some embodiments may include multiple such assemblies in each of the horizontal and vertical housings 110, 120 to provide for different lighting options at different angles across the read-zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130 such as a control panel or other such device. In yet other embodiments, the illumination assemblies 118, 128 may be coupled to the multi-port network switch 140 which may route triggering controls from the main board 130. TDR 152, one or more of the peripheral cameras 154, 156, and the display 158 may also include associated illumination assemblies to supporting functionality of the respective components. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the data readers 112, 114, 116, 122, 124, 126 (including TDR 152 and peripherals cameras 154, 156). Monochrome images may be captured by monochrome data readers 112, 114, 122, 124 and color images may be captured by color data readers 116, 126. Similarly, monochrome and/or color images may be captured by the TDR 152 and/or peripherals cameras 154, 156 depending on their configuration. The multi-port network switch 140 may be configured to coordinate (e.g., synchronize) timing of camera exposure and active illumination (e.g., white illumination) with the color data readers 116, 126 (as controlled by the controller on the main board 130) to occur in an offset manner with the timing of the camera exposure and active illumination (e.g., red illumination) with the monochrome data readers 112, 114, 122, 124.

Image data (e.g., streaming video, image frames, etc.) from the color data readers 116, 126 may be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the color images internally within the data reading system 100 by the one or more processors 135 supported by the main board 130. In some embodiments, barcode decoding may also be performed on the captured color images internally within the data reading system 100 by the one or more processors 135 supported by the main board 130. Image data from the color data readers 116, 126 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the color images externally to the data reading system 100 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources. In some embodiments, data readers 116, 126 may have their own on-board processors configured to perform image analysis, decoding, and/or other pre-processing of the image data separate from, or in coordination with, processing done on the main board 130 or other remote systems.

Image data from the monochrome data readers 112, 114, 122, 124 may be provided to the main board 130 to the processing/analysis modules located internal to the data reading system 100 such as the one or more processors 135 supported by the main board 130. As such, barcode decoding may also be performed on the color images internally within the data reading system 100 by the one or more processors 135 supported by the main board 130. In some embodiments, image analysis (e.g., AI, machine learning, OCR, object recognition, item validation, produce recognition, analytics, etc.) may be performed on the monochrome images internally within the data reading system 100 by the one or more processors 135 supported by the main board 130. Image data from the monochrome data readers 112, 114, 122, 124 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the monochrome images externally to the data reading system 100 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may also be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reading system 100 by the one or more processors 135 supported by the main board 130. In some embodiments, barcode decoding may also be performed on such images captured by the TDR 152 and other external peripheral cameras 154, 156 internally within the data reading system 100 by the one or more processors 135 supported by the main board 130. Image data from the TDR 152 or other external peripheral cameras 154, 156 may also be routed through the multi-port network switch 140 to external devices, such as the display 158, the remote server 160, point-of-sale system 162, or other similar devices including any network enabled POS systems. As such, image analysis (e.g., AI, machine learning, OCR, object recognition, item validation, produce recognition, analytics, etc.) may be performed on these images externally to the data reading system 100 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (POE)) to the main board 130 and the data readers 116, 126. Data readers 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

As noted above, in some embodiments, the data reading system 10, 100 includes at least one imager capable of operating in a first image-processing mode for reading optical codes (e.g., barcodes, optical character recognition, digital watermarks, etc.), and in a second image-processing mode for processing color images for produce recognition, item recognition, item verification, security analysis, or other suitable needs. For example, in one embodiment, the TDR 54, 152, may include a color imager facing downwardly toward the platter 42 (see FIG. 1), where the TDR 54, 152 is operable to read optical codes in a first data reading from items 20 passing through the read region of the platter 42, and also operable (e.g., if requested by the user or host) to capture and analyze image data of items 20 passing through the read region for other purposes, such as produce and item recognition as described previously.

As noted above, the first image-processing mode may be optimized for optical code reading and include image-processing configurations such as fixed color gain correction or automatic white balance (AWB with unit color correction matrix and zero shift. For image acquisition, the first image-processing mode may include a short exposure time and a narrow LED (or suitable illumination) pulse and general ambient light as color correction from AWB or fixed color gains of LED pulses, and demosaic interpolation. Similarly, the second image-processing mode may be optimized for color image and video capture, and may include a longer exposure time with automatic exposure control (AEC) for optimizing image acquisition and visual perception. In some embodiments, the TDR 54, 152 may include a third image-processing mode that includes a combination of features of the first and second image-processing modes designed to balance the image-processing functionality such that the data reader is suitable for both optical code reading and color-image processing while configured in a single mode. It should be understood that while the foregoing description provides TDR 54, 152 as an example for an imager configured with multiple image-processing modes, in other embodiments, any suitable data reader of the data reading systems 10, 100 may be configured as described. Additional details of these and other embodiments are provided with more detail below with particular reference to FIGS. 3-10.

Figure 3:
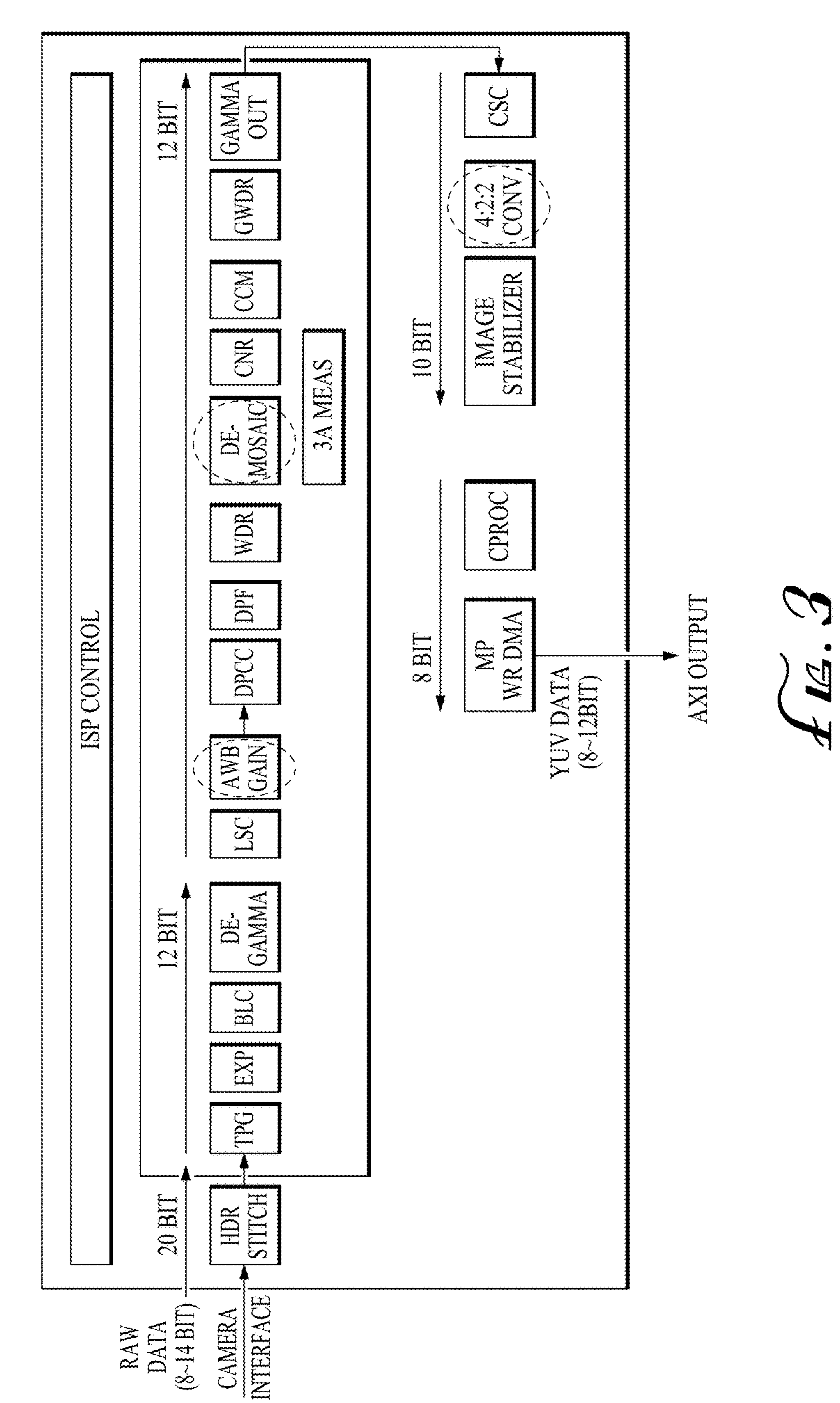
FIG. 3 is a simplified block diagram illustrating an example image signal-processing (ISP) algorithm for processing images obtained by a data reader in accordance with one embodiment.

FIG. 3 illustrates an example image signal processing (ISP) algorithm 300 that may be implemented and used by, or in connection with, the TDR 54, 152 (or other suitable component of the data reading system 10, 100) to process the captured image data. As mentioned previously, in one embodiment, the TDR 54, 152 is a color data reader capable of acquiring one or more color images of the item 20 on the read region of the data reading system 10, 100. Accordingly, in one example embodiment, the original image data captured via the TDR 54, 152 is in a Bayer patterned raw pixel data format. Briefly, in a Bayer pattern image, each pixel is filtered to record only one of three RGB colors, meaning the data from each pixel cannot fully specify each of the red, green, and blue values on its own. To obtain a full-color image, an image signal processing algorithm such as the one illustrated in FIG. 3 may be implemented and may include de-mosaic algorithms to interpolate complete red, green, and blue values for each pixel. Generally speaking, de-mosaic algorithms make use of the surrounding pixels of the corresponding colors to estimate the values for a particular pixel to generate a full-color image. Additional details of the ISP algorithm 300 are provided below.

With reference to FIG. 3, the following provides additional definitions and details relating to the ISP algorithm 300. Briefly, the basic function of the ISP algorithm 300 is to implement color balance and color pixel interpolation (de-mosaic) to convert the Bayer pattern image to a full color image that may be used for decoding optical codes and/or item verification, among other potential uses. The ISP algorithm 300 also includes several other features suitable for beautification and fine tuning of the color image. With reference to FIG. 3, the following legend provides additional details of several features of the ISP algorithm 300. With reference to FIG. 3, the ISP algorithm 300 may include:

- HDR Stitch: High Dynamic Range stitching;
- TPG: Test Pattern Generator;
- EXP: Expand LUT (lookup table), image data linearization of sensor compression mode
- BLC: Black Level Compensation, adjusts black level of sensor;
- De-Gamma: Image data linearization if Gamma is applied inside imager;
- LSC: Lens Mesh-Shading Correction, improves uniformity of the illumination and color, achromatic aberration and vignetting;
- AWB Gain: Auto White Balance Gain, adjusts white balance based on lighting conditions;
- DPCC: Defect Pixel Cluster Correction, adjusts for any defective pixels in imager;
- DPF: Denoising Pre-Filter, filters noise from images while preserving their underlying structure and details;
- WDR: VSI dynamic range compression and local tone mapping engine;
- 3A Meas: Automatic Exposure/Gain Control, Automatic White Balance, and Automatic Focus Control;
- De-Mosaic: Converts the RAW Bayer pipeline data into 12-bit RGB;
- CNR: Chroma Noise Reduction, reduces noise in digital image and video;
- CCM: Color Correction Matrix, adjusts color on-the-fly based on light source;
- GWDR: Programmable LUT (lookup table) based global tone curve to improve global luminance;
- Gamma Out: Programmable 64-node piecewise linear LUT (lookup table) for gamma correction, separated LUT (lookup table) for R, G, B colors;
- CSC: Color Space Conversion, 3×3 Matrix, RGB to YUV444; 4:2:2 Conv: Conversion from YUV444 to YUV422;
- Image Stabilizer: The output can be cropped to a desired programmable size (Height×Width);
- CPROC: Color Processing, implements global contrast, brightness, hue, and saturation regulation; and
- MP Wr DMA: write the output image data to memory on-the-fly.

It should be understood that the ISP algorithm 300 of FIG. 3 and further described above is meant to provide an example algorithm that may be used for processing image data obtained by the TDR 54, 152 (and/or other data readers) of the data reading systems 10, 100. In other embodiments, other suitable image-processing algorithms may be used and may include more or fewer features than those included in ISP algorithm 300 of FIG. 3.

As mentioned previously, one advantage of the data reading systems 10, 100 relates to the use of a single color data reader (e.g., TDR 54, 152 or other suitable data readers) configured with multiple image-processing modes, including at least a first image-processing mode configured specifically for reading optical codes (e.g., barcodes and other optical character-based symbologies) either in a monochrome format or a color format, and a second image-processing mode configured specifically for analyzing color images for accomplishing item recognition, item verification, any other intensive image processing tasks, or for handling suitable visual functions or purposes as desired by the user. In some embodiments, the data reader may include additional image processing modes other than the two mentioned above. Additional details relating to the first and second image-processing modes and other embodiments of the color data reader are provided below.

To establish a frame of reference and for ease of understanding, the following discussion and examples are provided with reference to the TDR 54, 152 as an example color data reader. It should be understood that this configuration is intended for illustrative purposes. In other embodiments, other data readers of the data reading systems 10, 100 may be configured and used in the fashion further described below.

FIG. 4 is an example table 400 summarizing various image-processing features that may be enabled for each of the multiple data reader image-processing modes in accordance with one embodiment. With collective reference to FIGS. 3-4, in one embodiment, TDR 54, 152 may be configured with at least two image-processing modes. As mentioned previously, in a first image-processing mode, TDR 54, 152 may be configured with selected image processing parameters for optimizing optical code reading (e.g., barcodes, digital watermarks, or other suitable optical symbologies) with the goal of preserving the Modulation Transfer Function (MTF) of the raw images. In one example embodiment, when TDR 54, 152 is configured in the first image-processing mode, the image-processing parameters of the ISP algorithm 300 that are enabled may be selected to allow only application of a demosaic process and AWB gain balance (for instances where the data reader does not have a fixed gain) or fixed color gains for the LEDs used to ensure the original image characteristics are maintained. For monochrome optical code reading, only luminance channel Y may be used. For reading color optical codes, the full RGB image may be used. For reference, FIG. 3 illustrates the primary features of the first image-processing mode in dashed lines.

In some embodiments, the default mode for the TDR 54, 152 may be set to the first image-processing mode since a majority of items 20 being processed in a typical retail checkout transaction are likely to include readable optical codes, typically in monochrome format but may also include color format. Accordingly, setting TDR 54, 152 to the first image-processing mode as a default may streamline the checkout transaction and minimize the need for toggling between other image-processing modes.

For processing items 20 that may not have optical codes, and/or where it is desired to focus more on image features or visual perception of the items being processed such as for item recognition and security applications, TDR 54, 152 may be set to the second image-processing mode. In some embodiments, the imaging mode change may be requested by the host, application software, or the user as further described below with reference to FIGS. 5-10. In this second image-processing mode, color fidelity, color calibration, and other image quality factors become much more important for optimizing the visual perception of the image. Accordingly, the second image-processing mode includes additional image-processing parameters to help produce a color image of desired quality needed for more intensive image analysis. For example, in one embodiment, the second image-processing mode may include the features noted in the second column (TDR Mode 2) of table 400 in FIG. 4.

As noted previously, in some embodiments, TDR 54, 152 may include a third image-processing mode with enabled features suitable for accomplishing both optical code reading (similar to the first image-processing mode) and item recognition or the like (similar to the second image-processing mode). However, since the third-image processing mode is designed as a compromise between the first and second image-processing modes, the third image-processing mode may not be optimized to accomplish each task as well as the respective first image-processing mode and the second image-processing modes. On some occasions though, the data reader may be configured in the third image-processing mode with suitable image-processing features selected to best balance the image-processing capabilities of TDR 54, 152 for adequately performing both optical code reading and item recognition (or the like). Table 400 of FIG. 4 provides an example embodiment of enabled features for configuring the TDR 54, 152 in the third image-processing mode.

FIGS. 5-8 are examples of various images captured with a data reader configured in the first image-processing mode and the second image-processing mode in accordance with one embodiment. FIG. 5 illustrates an image 500 of various optical codes captured in the first image-processing mode where the data reader is specifically configured for reading optical codes and other symbologies. With reference to FIG. 5, the image 500 shows various optical codes in various colors and against different color backgrounds as may be encountered during a typical retail transaction. As noted previously, in the first image-processing mode, the raw image is minimally processed for MTF preservation. For comparison, FIG. 6 illustrates an image 600 captured with a data reader configured in the second image-processing mode showing the same optical codes and backgrounds illustrated in FIG. 5. As mentioned previously, in the second image-processing mode, the data reader is specifically configured for item recognition and related functionality (and not necessarily for optical code reading), meaning that the image may be optimized for color accuracy and visual perception. As between the two images 500, 600, the data reader is more easily able to decode the various optical codes from image 500 when in the first image-processing mode as compared to the image 600 when in the second image-processing mode. It should be noted that the data reader may still be able to decode some optical codes while in the second image-processing mode, however, the first image-processing mode provides a more optimized configuration for decoding optical codes in a broader range of environments as compared to the second image-processing mode.

FIG. 7 illustrates another image 700 showing fruit positioned within the read region of the data reading system 10, 100. In FIG. 7, the image 700 is captured with the data reader configured in the first image-processing mode for reading optical codes. As shown in image 700, the fruit is quite poorly captured and may make it difficult for item recognition processes to identify the fruit from the image 700. On the other hand, in FIG. 8, the image 800 is captured with the data reader configured in the second image-processing mode. As shown in FIG. 8, the image 800 captures the fruit in a much better quality and with better color fidelity, making it much more likely for the image-processing algorithm to successfully identify the fruit.

In some embodiments, instructions for selecting and applying the processing parameters for each of the image-processing modes of the data reader may be stored in a single file to maximize overall system efficiencies. For example, FIG. 9 illustrates a table 900 outlining parameter changes that may be executed by a processor (e.g., processor 135 shown in FIG. 2), where the processor enables and disables various parameters as needed when toggling between the various image-processing modes. By enabling and disabling certain subsets of parameters, the data reading system 10, 100 can efficiently toggle and configure the data reader with the various image-processing modes. In other embodiments, instructions for each image-processing mode may instead be stored in separate files that are executed separately upon selection of a desired image-processing mode.

It should be understood that the parameters illustrated in table 900 may be adjusted differently in other embodiments as desired, such as to account for different variables, different performance features or characteristics of the data readers, different environments of use and lighting conditions, etc. For example, with reference to FIG. 9, the AWB (automatic white balance) parameter in the first image-processing mode may be enabled or disabled depending on whether the data reader has a fixed gain setting. In cases where the data reader has a fixed gain setting, the AWB parameter may be disabled by the processor in the first image-processing mode since such adjustments would not be necessary. If, however, the data reader does not have a fixed gain, then the AWB parameter may be enabled and may be set as outlined in the table 900.

Figure 10:
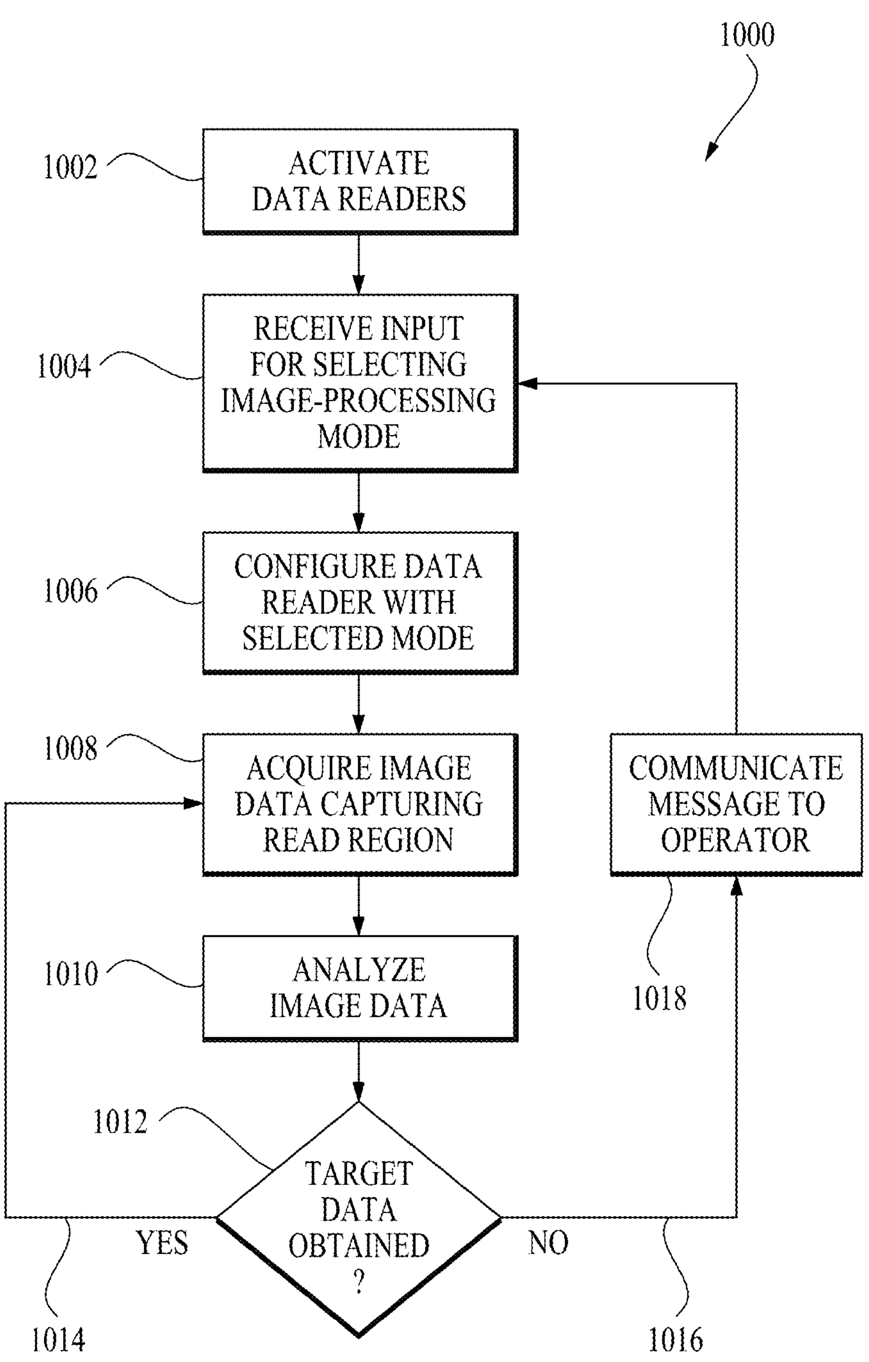
FIG. 10 is a flow chart illustrating a data reading process in accordance with one embodiment.

FIG. 10 is a flow chart illustrating a method 1000 of data reading in accordance with one embodiment. For convenience and to avoid repetition, the following discussion proceeds primarily with reference to the data reading systems 10, 100 of FIGS. 1-2, but it should be understood that the method 1000 described with reference to FIG. 10 may apply equally to other data reading system configurations that may include additional or fewer components than those described with reference to the data reading systems 10, 100.

As described in further detail below with particular reference to method 1000 of FIG. 10, the improved data reading system 10, 100 is designed to configure a data reader (described herein for ease of reference as the TDR 54, 152 of FIGS. 1-2) with multiple image-processing modes suitable for completing a transaction in a retail checkout system. It should be understood that although the written description may reference only one data reader of the data reading system 10, 100 being configured with multiple image-processing modes, other embodiments for data reading systems 10, 100 may include multiple such data readers each configured with multiple image-processing modes. The following description provides additional details of the method 1000 in accordance with one embodiment.

With reference to FIG. 10, at step 1002, the processor 135, and/or other suitable component(s) of the data reading system 10, 100 that may be in communication with the processor 135, executes a boot sequence that includes powering on and configuring the various components of the data reading system 10, 100 after the data reading system 10, 100 is powered on. The executable instructions for the boot sequence may be accessed via the processor 135 from the system memory 132, from the storage device 166, from the remote server 160, or from any other suitable source. As part of the boot sequence, the processor 135 (or other unit in communication therewith) detects, activates, and configures one or more of the data readers (e.g., data readers 50, 52, 54 of FIG. 1, or data readers 112, 114, 116, 122, 124, 126, 152, including TDR 152 and/or peripheral cameras 154, 156, of FIG. 2) to ensure the data readers are operable for capturing images of any items 20 passing through the read region. The processor 135 may also activate any associated illumination sources (e.g., illumination sources 118, 128) operable to support the corresponding data readers and ensure that the respective fields-of-view of the data readers are properly illuminated for capturing image data. As noted previously, the term "data reader" is used herein in an expansive sense and in the examples provided herein encompasses the TDR 54, 152 and the peripheral cameras 154, 156. In other embodiments, the term "data reader" may include other suitable devices. Accordingly, in some embodiments, the processor 135 may also initiate communication with TDR 152 and/or peripheral cameras 154, 156 that may be connected (e.g., wired or wirelessly). Such TDR 152 and/or peripheral cameras 154, 156 may also have fields-of-view that are directed toward the platter 42 to identify whether an item 20 is placed thereon during the boot sequence.

At step 1004, the processor 135 receives input from an operator (e.g., a customer, clerk, or other personnel) of the data reading system 10, 100 for selecting an image-processing mode of the data reader depending on the intended functionality and/or needs for processing particular data. In some embodiments, the operator may input commands via the display 158 (or via another suitable input device) or by pressing a button associated with the data reading system 10, 100 to register a responsive command, or by using other suitable communication systems or means (e.g., keyboard, stylus, voice commands, etc.) associated with the data reading system 10, 100. In other embodiments, the processor 135 may initiate and display a prompt requesting selection of an image-processing mode to which the operator may respond via the display 158 or via other suitable means.

As mentioned previously, the data reader may be configurable in at least two image-processing modes, including in a first image-processing mode configured for reading optical codes from an item, and in a second image-processing mode configured for analyzing image data to identify items, verify items, and/or take other suitable actions, typically such actions that involve more intensive image analysis. In other embodiments, additional image-processing modes may also be included. For example, the data reader may be configurable to a third image-processing mode with a balanced image-processing algorithm that configures the data reader such that it is suitable for both optical code reading and image analysis (i.e., a combination of the first and second image-processing modes).

At step 1006, the processor 135 configures the data reader responsive to the selected image-processing mode. As noted previously, in some embodiments, the data reader may include at least two or more image-processing modes, including one optimized for optical code reading and one for capturing colored images of optimal quality for more intensive image-analysis suitable for item recognition, item verification, and the like. As mentioned previously, in some embodiments, the data reader may be set to a default image-processing mode associated with optical code reading since most items processed in a retail transaction are likely to include a decodable optical code. As described with reference to FIG. 9 and table 900, in some embodiments, the processor 135 may simply enable and disable various image-processing parameters as set forth in a single instruction file with information for all available image-processing modes. In this fashion, the processor 135 may efficiently toggle between image-processing modes selected by the operator to minimize delay during operation.

At step 1008, the data reader obtains image data capturing the read region and any item(s) present therein. As noted previously, the data reader is preferably a color data reader such that the captured image data includes color images and/or color videos. At step 1010, once the image data of the read region has been obtained, the processor 135 (and/or other suitable modules of the data reader in communication therewith) receives and analyzes the image data. Depending on the image-processing mode selected for the data reader, the processor 135 (and/or other suitable modules) may attempt to decode an optical code from the image data, such as when the data reader is configured in the first image-processing mode as described in the example embodiments herein. Otherwise, the processor 135 (and/or other suitable modules) may implement image analysis techniques to identify the item, verify the item, or take other suitable action depending on the programmed parameters of the second image-processing mode. The processor 135 may employ any one of various suitable image analysis techniques configured for identifying the item, including SIFT (Scale-Invariant Feature Transform) or SURF (Speeded Up Robust Features) methods or other suitable methods.

If the processor 135 (and/or other suitable modules) successfully obtains the target data from the image data, such as by decoding the optical code (when in the first image-processing mode) or successfully identifying the item (when in the second image-processing mode), decision 1012 proceeds along "YES" branch 1014 and the method 1000 may continue with the data reader obtaining another image for processing the next item in the transaction. To expedite transactions, the data reader may remain configured in the same image-processing mode that led to the prior successful read for continued processing of items in the transaction. In other embodiments, the processor 135 may instead receive input for selecting a different image-processing mode (as described with reference to step 1014) to process subsequent items.

If the processor 135 (and/or other suitable modules) fails to obtain the target data, such as by failing to decode the optical code (when in the first image-processing mode) or successfully identifying the item (when in the second image-processing mode), decision 1012 may instead proceed along "NO" branch 1016. At step 1018, in some embodiments, the processor 135 communicates a message to the operator regarding the failed status. The form of communication may take any one of several suitable forms designed to alert the user to the issue. For example, the processor 135 may present the image(s) obtained of the read region showing the item on the platter 42, or may display a suitable error symbol or signal indicating the issue (e.g., flashing light, error code, etc.), and/or transmit a message (via suitable text, audio, or other formats) regarding the issue via the display 158 associated with the data reading system 10, 100 and prompt the user to resolve the issue. In other embodiments, the processor 135 may also (or alternatively) emit a beeping or other audible signal via a speaker or otherwise convey a suitable message to prompt the user to address the issue. Any combination of all such messages is also contemplated in embodiments of the disclosure.

In some embodiments, the operator's response to the communication at step 1018 may including toggling the image-processing mode of the data reader and repeating step 1004, where the processor 135 receives the input from the operator to configure the data reader with a new image-processing mode. Based on the operator input, the processor 135 may then configure the data reader with the new selected image-processing mode and proceed as described above. For example, after receiving the communication at step 1018, the operator may determine that the data reader requires a new image-processing mode and may toggle the data reader from the first image-processing mode to the second image-processing mode and thereafter repeat steps 1006-1012 in an attempt to successfully acquire target data and continue with the transaction.

In some embodiments, instead of awaiting user input after the communication at step 1018 before proceeding, the processor 135 may automatically toggle to a new image-processing mode and continue the process from step 1006 to attempt to successfully decode an optical code from image data and/or identify the item in the transaction and/or take any other suitable action for the data reading system 10, 100.

In one embodiment, the data reader is initially configured in the first image-processing mode as a default for barcode reading since this configuration is the most likely to be used in typical retail transactions. Thereafter, when the host, application software on the host, or user is processing items that may benefit from a color image application (e.g., produce recognition), the host may send instructions to configure the data reader in the second image-processing mode. In some embodiments, the data reader may then continue capturing images in the second image-processing mode for a pre-determined time or for a target number of frames. Once that condition is satisfied, the host may reset the data reader back to the first image-processing mode for barcode reading.

As illustrated in FIG. 10, the method 1000 provides a streamlined approach for configuring a data reader for a data reading system 10, 100 with various image-processing modes suitable for reading and decoding optical code data from an item and for implementing rigorous image-processing techniques for item identification, item verification, and/or other handling other suitable tasks. As described, the method 1000 is designed to allow an operator to selectively configure the data reader with any suitable image-processing mode as needed to accomplish a selected function of the data reading system 10, 100.

It should be understood that in other embodiments, certain steps described in method 1000 of FIG. 10 may be combined, rearranged, altered, varied, and/or omitted without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system comprising:

a housing having a read region;

one or more data readers supported by the housing, each data reader having a field-of-view directed to the read region, wherein each data reader is operable to capture image data of an item as the item passes across the read region of the housing, and wherein at least one of the one or more data readers is configurable with at least a first image-processing mode for reading an optical code and a second image-processing mode for processing color images for item identification; and a processor in communication with the at least one data reader, wherein the processor is operable to execute instructions and configure the at least one data reader in the first image-processing mode, wherein the at least one data reader is operable to decode optical codes from the image data, and the second image-processing mode, wherein the at least one data reader is operable to perform image analysis to identify the item from the image data, wherein the first image-processing mode and the second image-processing mode include different sets of image-processing parameters relative each other with respect to at least color correction, defective pixel correction, noise filtering, color gain, image compression, and/or black level compensation such that performance of reading the optical code is improved during the first image-processing mode and performance of item identification is improved during the second image processing mode.

2. The data reading system of claim 1, wherein the first image-processing mode includes a first set of image-processing parameters and the second image-processing mode includes a second set of image-processing parameters, and wherein the processor is further operable to toggle the at least one data reader between the first image-processing mode and the second image-processing mode by enabling the first set of image-processing parameters or the second set of image-processing parameters responsive to operator input.

3. The data reading system of claim 1, further comprising an image-signal processing algorithm including a set of image-processing parameters stored in an instruction file, wherein the processor is operable to execute instructions for enabling a first set of image-processing parameters from the instruction file when configuring the at least one data reader in the first image-processing mode and for enabling a second set of image-processing parameters from the instruction file when configuring the at least one data reader in the second image-processing mode.

4. The data reading system of claim 1, wherein the at least one data reader is further configurable in a third image-processing mode, and wherein the processor is operable to execute instructions to configure the at least one data reader in the third image-processing mode, wherein the at least one data reader is operable both to decode optical codes from the image data and to perform image analysis to identify the item from the image data.

5. The data reading system of claim 4, further comprising an image-signal processing algorithm including a set of image-processing parameters stored in an instruction file, wherein the processor is operable to execute instructions for enabling a first set of image-processing parameters from the instruction file when configuring the at least one data reader in the first image-processing mode, for enabling a second set of image-processing parameters from the instruction file when configuring the at least one data reader in the second image-processing mode, and for enabling a third set of image-processing parameters from the instruction file when configuring the at least one data reader in the third image-processing mode, and wherein the first, second, and third sets of image-processing parameters are different.

6. The data reading system of claim 4, wherein the at least one data reader is a top-down data reader supported on an end of post extending upwardly from the housing.

7. The data reading system of claim 1, wherein the at least one data reader is a color data reader and the image data includes color image data.

8. The data reader of claim 1, wherein processing color images for item identification includes at least one of produce recognition, item recognition, item verification, or security analysis.

9. The data reader of claim 1, wherein the first image processing mode includes an automatic white balance parameter being disabled when the data reader has a fixed gain setting, and the second image processing mode includes the automatic white balance parameter being enabled when the data reader has an auto gain setting.

10. The data reader of claim 1, wherein the first image processing mode includes an automatic white balance parameter being disabled when the data reader has a fixed gain setting, and the second image processing mode includes the automatic white balance parameter being enabled when the data reader has an auto gain setting.

11. A method of data reading via a data reading system, the method comprising:

activating, via a processor, one or more data readers, wherein at least one of the one or more data readers is configurable with at least a first image-processing mode for reading an optical code and a second image-processing mode for processing color images for item identification;

receiving, via the processor, input selecting one of the first image-processing mode or the second image-processing mode;

configuring, via the processor, the at least one data reader with the selected one of the first image-processing mode or the second image-processing mode responsive to the input, wherein the first image-processing mode and the second image-processing mode include different sets of image-processing parameters relative each other with respect to at least color correction, defective pixel correction, noise filtering, color gain, image compression, and/or black level compensation such that performance of reading the optical code is improved during the first image-processing mode and performance of item identification is improved during the second image processing mode; and capturing, via the at least one data reader, image data of an item as the item passes across a read region of the data reading system, wherein:

when the at least one data reader is in the first image-processing mode, the method further includes decoding, via the processor, an optical code from the image data, and when the at least one data reader is in the second image-processing mode, the method further includes analyzing, via the processor, the image data to identify the item.

12. The method of claim 11, the method further comprising:

communicating, via the processor, a message in response to the processor failing to decode the optical code when in the first image-processing mode or failing to identify the item when in the second image-processing mode;

receiving, via the processor, input responsive to the message; and configuring, via the processor, the at least one data reader with a selected one of the first image-processing mode or the second image-processing mode responsive to the input.

13. The method of claim 11, where the step of configuring the at least one data reader with the selected one of the first image-processing mode or the second image-processing mode, further comprises:

enabling, via the processor, a subset of image-processing parameters corresponding to the selected one of the first image-processing mode or the second image-processing mode, wherein the subset of image-processing parameters is different between the first image-processing mode and the second image-processing mode.

14. The method of claim 13, further comprising selecting, via the processor, the subset of image-processing parameters from a set of image-processing parameters stored in an instruction file, wherein the set of image-processing parameters includes available image-processing parameters for both the first image-processing mode and the second image-processing mode.

15. The method of claim 11, where the step of configuring the at least one data reader with the selected one of the first image-processing mode or the second image-processing mode, further comprises:

enabling, via the processor, a first subset of image-processing parameters corresponding to the selected one of the first image-processing mode or the second image-processing mode; and disabling, via the processor, a second subset of image-processing parameters corresponding to a non-selected one of the first image-processing mode and the second image-processing mode.

16. The method of claim 11, wherein the at least one data reader is further configurable in a third image-processing mode, the method further comprising:

receiving, via the processor, input selecting the third image-processing mode; and configuring, via the processor, the at least one data reader with the selected third image-processing mode responsive to the input, wherein:

when the at least one data reader is in the third image-processing mode, the at least one data reader is operable both to decode optical codes from the image data and to perform image analysis to identify the item from the image data.

17. The method of claim 11, further comprising automatically configuring, via the processor, the at least one data reader to the non-selected one of the first image-processing mode and the second image-processing in response to the processor failing to decode the optical code when the first image-processing mode is selected or failing to identify the item when the second image-processing mode is selected.

18. The method of claim 11, wherein the at least one data reader is a color data reader and the image data includes color image data.

19. The method of claim 11, wherein processing color images for item identification includes at least one of produce recognition, item recognition, item verification, or security analysis.

* * * * *